United States Patent
Lv et al.

(10) Patent No.: US 8,897,162 B2
(45) Date of Patent: Nov. 25, 2014

(54) METHOD AND APPARATUS FOR CHANNEL MEASUREMENT

(75) Inventors: Yongxia Lv, Beijing (CN); Yongping Zhang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 77 days.

(21) Appl. No.: 13/570,541

(22) Filed: Aug. 9, 2012

(65) Prior Publication Data

US 2012/0320778 A1 Dec. 20, 2012

Related U.S. Application Data

(63) Continuation of application No. PCT/CN2011/070954, filed on Feb. 12, 2011.

(30) Foreign Application Priority Data

Feb. 12, 2010 (CN) .......................... 2010 1 0116460

(51) Int. Cl.
 *H04L 12/26* (2006.01)
 *H04L 1/00* (2006.01)
 *H04W 24/10* (2009.01)

(52) U.S. Cl.
 CPC .................................... *H04W 24/10* (2013.01)
 USPC ....................................................... 370/252

(58) Field of Classification Search
 CPC ..................................................... H04W 24/10
 USPC ....................................................... 370/252
 See application file for complete search history.

(56) References Cited

U.S. PATENT DOCUMENTS

| 2009/0196193 | A1  | 8/2009 | Frenger et al. |
| 2011/0034198 | A1  | 2/2011 | Chen et al. |
| 2014/0003240 | A1* | 1/2014 | Chen et al. ..................... 370/235 |

FOREIGN PATENT DOCUMENTS

| CN | 101047469 |   | 10/2007 |
| CN | 101064898 |   | 10/2007 |
| CN | 101064898 | A * | 10/2007 |
| CN | 101132633 | A | 2/2008 |

(Continued)

OTHER PUBLICATIONS

International Search Report, dated Jun. 2, 2011, in corresponding International Application No. PCT/CN2011/070954 (4 pp.).

(Continued)

*Primary Examiner* — Jung Park
*Assistant Examiner* — Albert Shih
(74) *Attorney, Agent, or Firm* — Staas & Halsey LLP

(57) ABSTRACT

The present invention discloses a method for channel measurement which includes: determining the size of measured bandwidth of a terminal and the location of the measured bandwidth in system bandwidth; determining the size of a measured sub-band and/or the quantity or sizes of measured sub-band sets according to the measured bandwidth; sending the determined size of the measured bandwidth and the location of the measured bandwidth in the system bandwidth, and the size of the measured sub-band and/or the quantity or sizes of the measured sub-band sets to the terminal; receiving measurement results returned by the terminal. With the method provided in the present invention, invalid feedback is prevented and effectiveness and accuracy of channel measurement and feedback are improved.

9 Claims, 5 Drawing Sheets

(56) References Cited

FOREIGN PATENT DOCUMENTS

| | | | | |
|---|---|---|---|---|
| CN | 101267664 A | * | 9/2008 | |
| CN | 101287261 A | | 10/2008 | |
| CN | 101335715 | | 12/2008 | |
| CN | 101567714 | | 10/2009 | |
| CN | 101567714 A | * | 10/2009 | |
| EP | 2296426 | | 3/2011 | |
| WO | 2009/079842 | | 7/2009 | |

OTHER PUBLICATIONS

Written Opinion of the International Searching Authority, dated Jun. 2, 2011, in corresponding International Application No. PCT/CN2011/070954 (4 pp.).

International Search Report of PCT/CN2011/070954 mailed Jun. 2, 2011.

Chinese Office Action mailed Mar. 7, 2013 for corresponding Chinese Application No. 201010116460.2.

* cited by examiner

METHOD AND APPARATUS FOR CHANNEL MEASUREMENT

CROSS-REFERENCE TO RELATED APPLICATIONS

This application is a continuation of International Application No. PCT/CN2011/070954, filed on Feb. 12, 2011, which claims priority to Chinese Patent Application No. 201010116460.2, filed on Feb. 12, 2010, both of which are hereby incorporated by reference in their entireties.

FIELD OF THE INVENTION

The present invention relates to the field of wireless communication, and in particular, to a method and an apparatus for channel measurement.

BACKGROUND OF THE INVENTION

Channel measurement is an important basis for a base station to perform scheduling and selecting transmission parameters. Therefore, accuracy of the measurement result directly affects system performance.

At present, the system bandwidth is the measurement object in various wireless communication systems. For example, in an LTE (Long Time Evolution, long time evolution) system, the PMI (Pre-coding Matrix Indicator, pre-coding matrix indicator) and CQI (Channel Quality Indicator, channel quality indicator) are two important parts of CSI (Channel State Information, channel state information). During channel measurement, a terminal measures the channel state at the entire system bandwidth, and feeds back CSI information obtained through measurement to a base station. In some scenarios, for example, in the low load scenario, only a small portion of the system bandwidth is activated and data is transmitted by using the activated bandwidth. Therefore, the measurement of the channel state within the entire system bandwidth is not accurate. Meanwhile, when a sub-band is measured at the entire system bandwidth, the terminal feeds back a large amount of CSI of the sub-band within the non-activated bandwidth. This results in invalid feedback and wastes the uplink signaling resources.

In addition, an operator has some bandwidth, for example, 7 M. The bandwidth is not standard bandwidth that is supported by the LTE and LTE-A (LTE Advanced, LTE advanced). A common solution for supporting such non-standard bandwidth is to divide the bandwidth into two component carriers of standard bandwidth, for example, 5 M and 3 M, and use a CA (Carrier Aggregation, carrier aggregation) technology. The actual bandwidth is 7 M, not 5 M+3 M, and the remaining 1 M bandwidth is not used to transmit data. Currently, the system bandwidth supported by the terminal is the standard bandwidth, and the system bandwidth is the measurement range. Therefore, the terminal can only measure the channel state information of the 5 M+3 M bandwidth. In this case, the interference produced at the 5 M+3 M−7 M bandwidth affects the accuracy of the channel measurement. In addition, when the sub-band is measured within the 5 M+3 M bandwidth, the terminal feeds back the CSI of the sub-band at the 5 M+3 M−7 M bandwidth to the base station as measurement results. This results in invalid feedback and wastes the uplink signaling resources.

In conclusion, in the prior art, the system bandwidth is taken as the measurement object, which may cause inaccuracy of the measurement and invalid feedback in some scenarios, for example, low load and CA.

SUMMARY OF THE INVENTION

To improve effectiveness and accuracy of channel measurement and feedback, embodiments of the present invention provide a method and an apparatus for channel measurement. The technical solutions are as follows:

A method for channel measurement includes:

determining the size of measured bandwidth of a terminal and the location of the measured bandwidth in system bandwidth;

determining the size of a measured sub-band and/or the quantity or sizes of measured sub-band sets according to the measured bandwidth;

sending the determined size of the measured bandwidth and the location of the measured bandwidth in the system bandwidth, and the size of the measured sub-band and/or the quantity or sizes of the measured sub-band sets to the terminal; and receiving measurement results returned by the terminal, where the measurement results are obtained after the terminal measures the measured bandwidth of the corresponding location and size in the system bandwidth, or obtained after the terminal measures the measured sub-band of the corresponding size at the measured bandwidth of the corresponding location and size in the system bandwidth, or obtained after the terminal measures measured sub-bands of the corresponding sizes in the measured sub-band sets of the corresponding quantity or size at the measured bandwidth of the corresponding location and size in the system bandwidth.

A method for channel measurement includes:

obtaining the size of measured bandwidth and the location of the measured bandwidth in system bandwidth, where the size and location are sent by a base station;

obtaining the size of a measured sub-band and/or the quantity or sizes of measured sub-band sets;

measuring the measured bandwidth of the corresponding location and size according to the size of the measured bandwidth and the location of the measured bandwidth in the system bandwidth; or measuring the measured sub-band of the corresponding size at the measured bandwidth of the corresponding location and size according to the size of the measured bandwidth and the location of the measured bandwidth in the system bandwidth, and the size of the measured sub-band; or measuring measured sub-bands of the corresponding sizes in the measured sub-band sets of the corresponding quantity or size at the measured bandwidth of the corresponding location and size according to the size of the measured bandwidth and the location of the measured bandwidth in the system bandwidth, and the size of the measured sub-band and the quantity or sizes of the measured sub-band sets; and returning measurement results to the base station.

An apparatus for channel measurement includes:

a bandwidth information determining module, configured to determine the size of measured bandwidth of a terminal and the location of the measured bandwidth in system bandwidth;

a sub-band information determining module, configured to determine the size of a measured sub-band and/or the quantity or sizes of measured sub-band sets according to the measured bandwidth determined by the bandwidth information determining module;

a sending module, configured to send the size of the measured bandwidth and the location of the measured bandwidth in the system bandwidth that are determined by the bandwidth information determining module, and the size of the measured sub-band and/or the quantity or sizes of the measured sub-band sets that are determined by the sub-band information determining module to the terminal; and a receiving module, configured to receive measurement results returned by the terminal, where the measurement results are obtained after the terminal measures the measured bandwidth of the corresponding location and size in the system bandwidth, or after the terminal measures the measured sub-band of the corresponding size at the measured bandwidth of the corresponding location and size in the system bandwidth, or after the terminal measures measured sub-bands of the corresponding size in the measured sub-band sets of the corresponding quantity or size at the measured bandwidth of the corresponding location and size in the system bandwidth.

An apparatus for channel measurement includes:

a bandwidth information obtaining module, configured to obtain the size of measured bandwidth and the location of the measured bandwidth in system bandwidth, where the size and the location are sent by a base station;

a sub-band information obtaining module, configured to obtain the size of a measured sub-band and/or the quantity or sizes of measured sub-band sets;

a measuring module, configured to measure the measured bandwidth of the corresponding location and size according to the size of the measured bandwidth and the location of the measured bandwidth in the system bandwidth that are obtained by the bandwidth information obtaining module; or measure the measured sub-band of the corresponding size at the measured bandwidth of the corresponding location and size according to the size of the measured bandwidth and the location of the measured bandwidth in the system bandwidth that are obtained by the bandwidth information obtaining module, and the size of the measured sub-band obtained by the sub-band information obtaining module; or measure measured sub-bands of the corresponding size in the measured sub-band sets of the corresponding quantity or size at the measured bandwidth of the corresponding location and size according to the size of the measured bandwidth and the location of the measured bandwidth in the system bandwidth that are obtained by the bandwidth information obtaining module, and the size of the measured sub-bands and the quantity or sizes of the measured sub-band sets that are obtained by the sub-band information obtaining module; and a result returning module, configured to return measurement results to the base station.

In an possible implementation form of the apparatus for channel measurement, wherein the sub-band information obtaining module comprises a first obtaining unit, a second obtaining unit, or a third obtaining unit; wherein:

the first obtaining unit is configured to receive the size of the measured sub-band and/or the quantity or sizes of the measured sub-band sets corresponding to the measured bandwidth sent by the base station;

the second obtaining unit is configured to determine the size of the measured sub-band and/or the quantity or sizes of the measured sub-band sets corresponding to the measured bandwidth according to the obtained size of the measured bandwidth and a preset correspondence between the size of the measured sub-band and/or the quantity or sizes of the measured sub-band sets and the measured bandwidth; and the third obtaining unit is configured to obtain a resource block group RBG in resource scheduling if presetting the size of the measured sub-band to be the same as a size of the RBG, and use the size of the obtained RBG as the size of the measured sub-band.

In an possible implementation form of the apparatus for channel measurement, wherein the apparatus further comprises a receiving module, configured to receive reference signals transmitted by the base station within a range of the measured bandwidth;

wherein the measuring module is specifically configured to measure the measured bandwidth of the corresponding location and size according to the reference signals; or measure the measured sub-band of the corresponding size at the measured bandwidth of the corresponding location and size according to the reference signals; or measure the measured sub-bands of the corresponding size in the measured sub-band sets of the corresponding quantity or size at the measured bandwidth of the corresponding location and size according to the reference signals.

The technical solutions provided in the embodiments of the present invention produce the following beneficial effect: The base station determines the size of the measured bandwidth of the terminal and the location of the measured bandwidth in the system bandwidth, and the size of the measured sub-band and/or the quantity or sizes of measured sub-band sets, and notifies the information to the terminal; according to the information, the terminal performs measurement, thereby preventing invalid feedback and improving effectiveness and accuracy of channel measurement and feedback.

DETAILED DESCRIPTION OF THE EMBODIMENTS

To make the objectives, technical solutions, and advantages of the present invention clearer, the following describes the embodiments of the present invention in detail with reference to the accompanying drawings.

Embodiment 1

Figure 1:
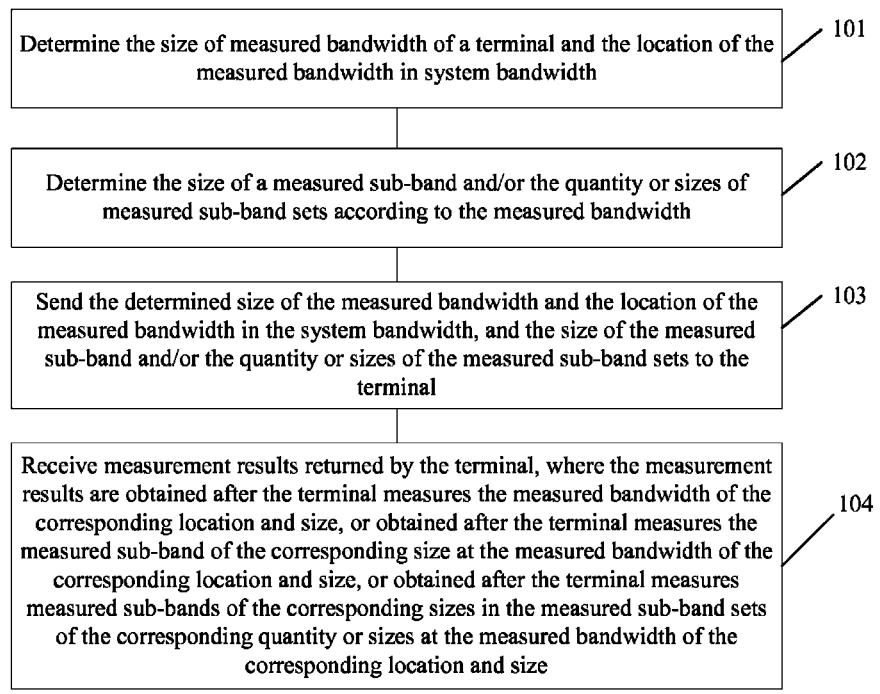
FIG. 1 is a flowchart of a method for channel measurement according to a first embodiment of the present invention.

Referring to FIG. 1, this embodiment provides a method for channel measurement, including the following steps:

101. Determine the size of measured bandwidth of a terminal and the location of the measured bandwidth in system bandwidth.

The system bandwidth refers to the length of the frequency supported and sent in a broadcast message by a wireless communication system. For example, the maximum system bandwidth in an LTE system is 20 M, or the system bandwidth in another length.

The measured bandwidth refers to a part of frequency resources determined by a base station in the system bandwidth and a terminal is allowed to perform channel measurement and feedback by using only these frequency resources. The measured bandwidth may be a section of continuous frequency resources at the system bandwidth, or may be composed of multiple distributed sections of continuous frequency resources. In addition, the measured bandwidth may be cell-specific. Terminals in different cells use measured bandwidth corresponding to their respective cells, and different terminals in the same cell use the same measured bandwidth configured by the base station. Alternatively, the measured bandwidth may be terminal-specific, and different terminals use their respective specific measured bandwidth configured by the base station.

102. Determine the size of a measured sub-band and/or the quantity or sizes of measured sub-band sets according to the measured bandwidth.

The sub-band refers to a resource unit composed of continuous RBs (Resource Block, resource block) at several frequencies.

A sub-band set is a set composed of several sub-bands. The quantity/size of sub-band sets indicates the quantity or sizes of sub-band sets.

103. Send the determined size of the measured bandwidth and the location of the measured bandwidth in the system bandwidth, and the size of the measured sub-band and/or the quantity or sizes of the measured sub-band sets to the terminal.

104. Receive measurement results returned by the terminal, where the measurement results are obtained after the terminal measures the measured bandwidth of the corresponding location and size, or obtained after the terminal measures the measured sub-band of the corresponding size at the measured bandwidth of the corresponding location and size, or obtained after the terminal measures measured sub-bands of the corresponding size in the measured sub-band sets of the corresponding quantity or size at the measured bandwidth of the corresponding location and size.

Figure 2:
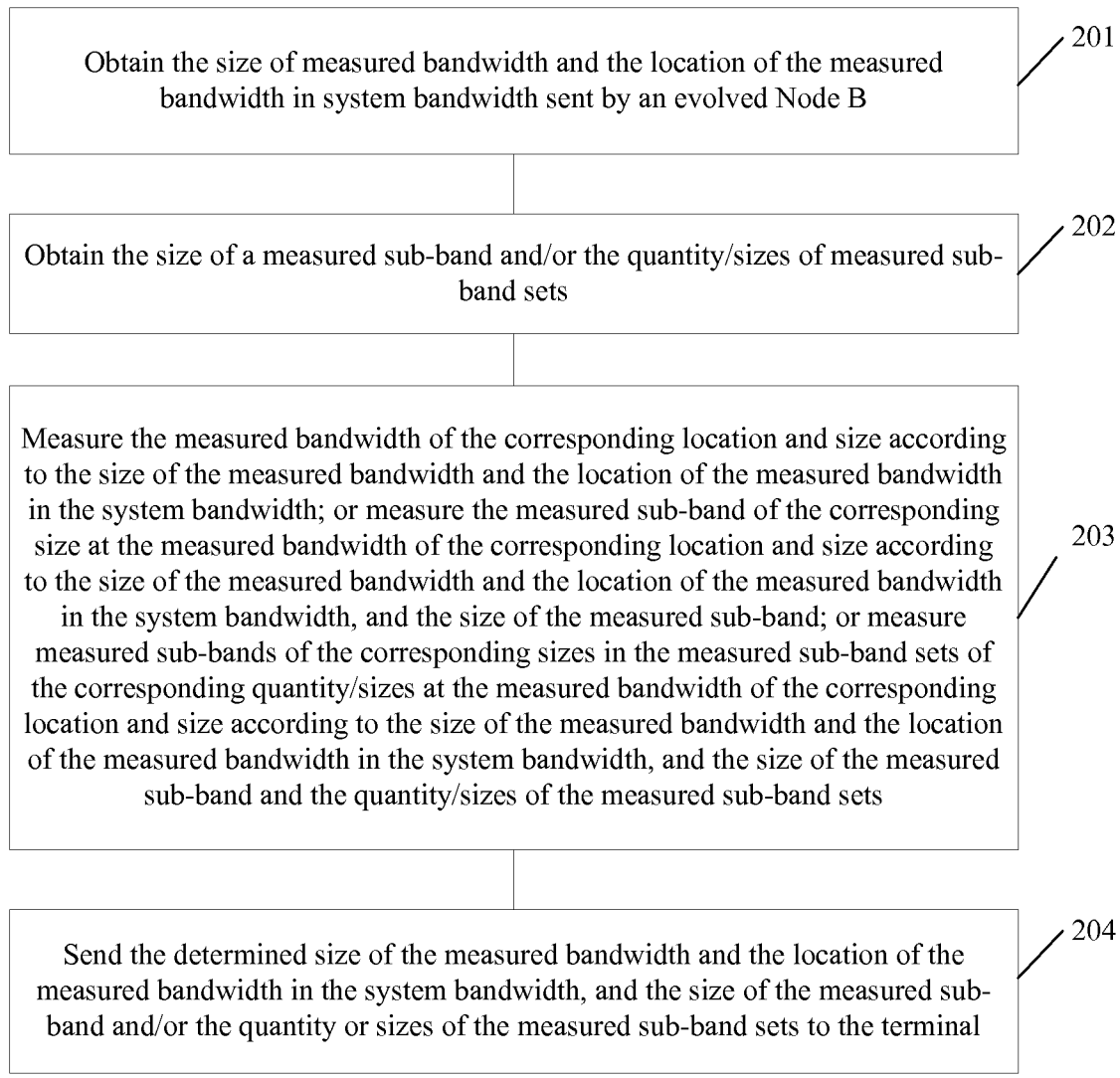
FIG. 2 is another flowchart of a method for channel measurement according to the first embodiment of the present invention.

Correspondingly, referring to FIG. 2, this embodiment provides a method for channel measurement, including the following steps:

201. Obtain the size of measured bandwidth and the location of the measured bandwidth in system bandwidth, where the size and the location are sent by a base station.

202. Obtain the size of a measured sub-band and/or the quantity/sizes of measured sub-band sets.

203. Measure the measured bandwidth of the corresponding location and size according to the size of the measured bandwidth and the location of the measured bandwidth in the system bandwidth; or measure the measured sub-band of the corresponding size at the measured bandwidth of the corresponding location and size according to the size of the measured bandwidth and the location of the measured bandwidth in the system bandwidth, and the size of the measured sub-band; or measure measured sub-bands of the corresponding size in the measured sub-band sets of the corresponding quantity/size at the measured bandwidth of the corresponding location and size according to the size of the measured bandwidth and the location of the measured bandwidth in the system bandwidth, and the size of the measured sub-band and the quantity/size of the measured sub-band sets.

204. Return measurement results to the base station.

According to the method provided in this embodiment, the base station determines the size of the measured bandwidth of the terminal and the location of the measured bandwidth in the system bandwidth, and the size of the measured sub-band and/or the quantity/sizes of measured sub-band sets, and notifies the information to the terminal. According to the information, the terminal performs measurement, thereby preventing invalid feedback and improving effectiveness and accuracy of channel measurement and feedback.

Embodiment 2

Figure 3:
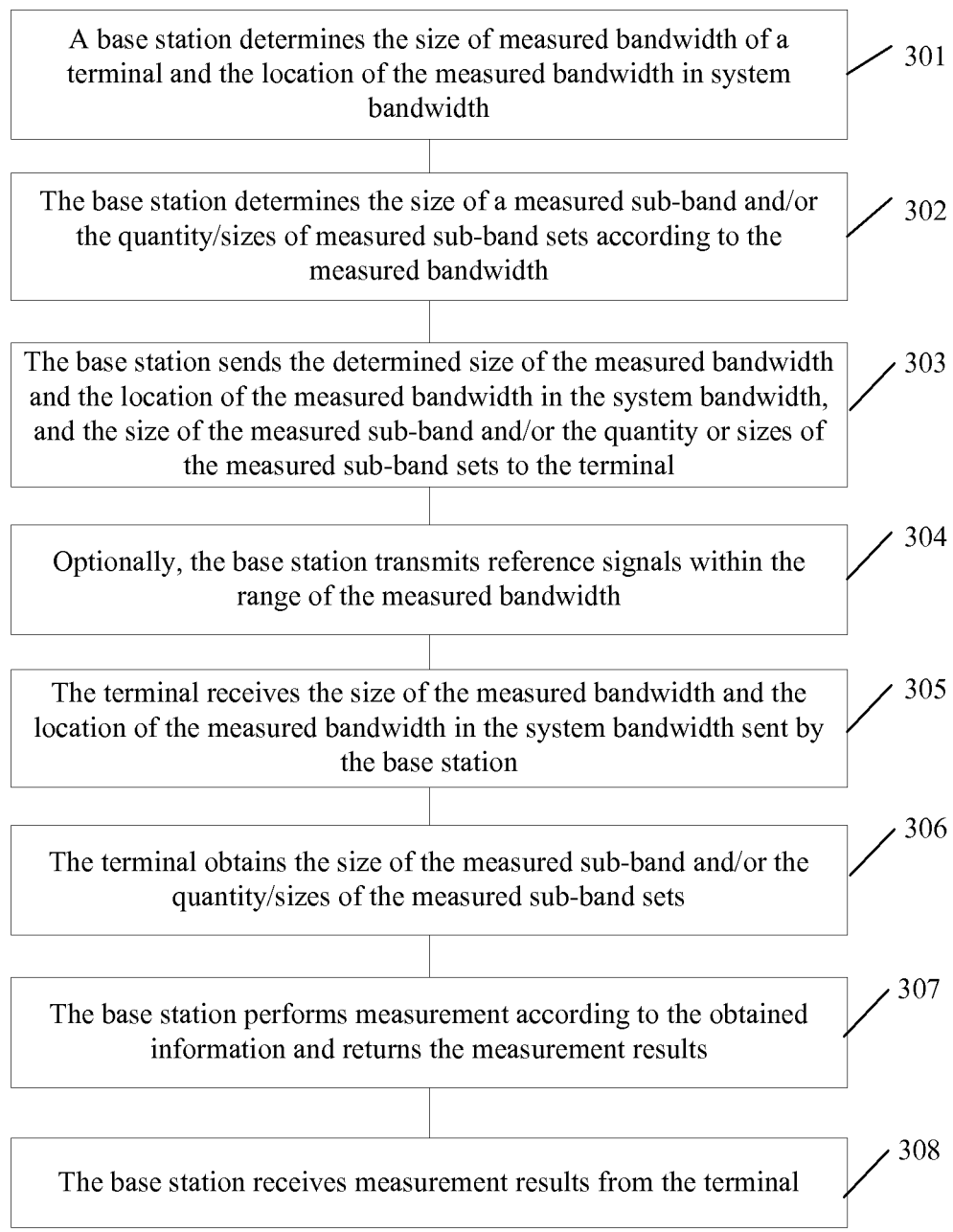
FIG. 3 is a flowchart of a method for channel measurement according to a second embodiment of the present invention.

Referring to FIG. 3, this embodiment provides a method for channel measurement, including the following steps:

301. A base station determines the size of measured bandwidth of a terminal and the location of the measured bandwidth in system bandwidth.

The definitions of the system bandwidth, measured bandwidth, sub-band can refer to steps 101 and 102, which are not detailed herein.

Through this step, the terminal can perform channel measurement within the range of the measured bandwidth, so as to improve accuracy and effectiveness of measurement results, and save uplink signaling resources.

302. The base station determines the size of a measured sub-band and/or the quantity/sizes of measured sub-band sets according to the measured bandwidth.

When the size of the measured sub-band is determined according to the measured bandwidth, the size of the measured sub-band determined according to the measured bandwidth is generally smaller than the size that is determined according to the system bandwidth because the measured bandwidth is generally smaller than the system bandwidth. Therefore, the granularity of sub-band measurement is reduced and the precision of sub-band measurement is improved.

303. The base station sends the determined size of the measured bandwidth and the location of the measured bandwidth in the system bandwidth, and the size of the measured sub-band and/or the quantity or sizes of the measured sub-band sets to the terminal.

In the information sent by the base station to the terminal, the size of the measured sub-band and the quantity/sizes of measured sub-band sets are two optional parameters. The manner of sending information by the base station includes a broadcast manner or a dedicated signaling manner. A dedicated signaling may specifically be an RRC (Radio Resource Control, radio resource control protocol) configuration message or a PDCCH (Physical Downlink Control Channel, physical downlink control channel) order (order).

The base station may send the size of the measured bandwidth and the location of the measured bandwidth in the system bandwidth, the size of the measured sub-band, and/or the quantity/sizes of measured sub-band sets by using at least the following two methods:

(1) The base station may divide the system bandwidth into at least one system sub-band set according to a preset relationship between the system bandwidth and the system sub-band set, and send location information of the system sub-band set occupied by the measured bandwidth to the terminal. The preset relationship between the system bandwidth and the system sub-band set is known to the terminal.

Specifically, the preset relationship may be notified to the terminal in a bitmap manner. For example, the system bandwidth has totally four system sub-band sets, where a second and a fourth system sub-band sets form the measured bandwidth. In this case, the base station notifies the terminal that the bitmap of the terminal is set to 0101.

This method is applicable to continuous or distributed measured bandwidth.

(2) The base station sends the start position and length of the measured bandwidth to the terminal.

This method is especially applicable to a section of continuous measured bandwidth, and may be applicable to the distributed measured bandwidth.

304. Optionally, the base station transmits reference signals within the range of the measured bandwidth.

The reference signal may specifically be a CSI-RS (Channel State Information Reference Signal, channel state information reference signal) or the like, which is not limited in this embodiment.

Further, the base station may generate reference signals according to the measured bandwidth, and may specifically generate the reference signals according to the number of RBs in the measured bandwidth and the number of reference signals corresponding to each RB. For example, 100 RBs are included if the system bandwidth is 20 M, and 25 RBs are included if the measured bandwidth is 5 M. In this case, if the density of the reference signals is one per RB, the base station generates a reference signal sequence with a length of 25 according to the length of the measured bandwidth.

In addition, the base station sends reference signals within the range of the measured bandwidth, which, as compared with sending the reference signals at an entire system bandwidth, can save energy. Meanwhile, as compared with the method for saving energy by adjusting the system bandwidth in the prior art, the method provided in this embodiment can be applied more widely. For example, an operator has some bandwidth, for example, 7 M. The bandwidth is not standard bandwidth supported by the LTE and LTE-A. To support such non-standard bandwidth, the LTE Rel-10 introduces the CA (Carrier Aggregation, carrier aggregation) technology and divides the bandwidth into two component carriers of standard bandwidth, for example, 5 M and 3 M. Actual bandwidth is 7 M, not 5 M+3 M, and the remaining bandwidth of 1 M is not used to transmit data. However, currently the system bandwidth supported by the terminal is the standard bandwidth and the measurement range falls within the system bandwidth. Therefore, the terminal can only measure the channel state information of the 5 M+3 M bandwidth. In this case, the interference produced at the 5 M+3 M−7 M bandwidth may affect the accuracy of channel measurement. During sub-band measurement within the 5 M+3 M bandwidth, the terminal may feed back the CSI at the sub-band within the 5 M+3 M−7 M bandwidth as measurement results to the base station. This may cause invalid feedback and waste uplink signaling resources. In this case, the base station introduces the measured bandwidth, specifies that the reference signals are generated according to the actual bandwidth length and the signals are transmitted within the actual bandwidth, so as to save energy. In addition, the measurement is performed only within the actual 7 M bandwidth, which may prevent the interference at the additional 5 M+3 M−7 M bandwidth, improve measurement accuracy, and enhances efficiency of measurement and feedback.

305. The terminal receives the size of the measured bandwidth and the location of the measured bandwidth in the system bandwidth, where the size and the location are sent by the base station.

306. The terminal obtains the size of the measured sub-band and/or the quantity/size of the measured sub-band sets.

The obtaining methods include at least the following three methods:

(1) If the information sent by the base station includes the size of the measured sub-band and/or the quantity/size of the measured sub-band sets, the terminal receives the size of the measured sub-band and/or the quantity/size of the measured sub-band sets sent by the base station.

(2) If the information sent by the base station does not include such information, the terminal determines the size of the measured sub-band and/or the quantity/size of the measured sub-band sets corresponding to the measured bandwidth according to the obtained size of the measured bandwidth and a preset correspondence between the size of the measured sub-band and/or the quantity/size of the measured sub-band sets and the measured bandwidth.

For example, a correspondence table shown in Table 1 is preset for both the base station and the terminal, and the base station determines that the measured bandwidth is 25 RBs, i.e., the measured bandwidth is 5 M, and notifies it to the terminal. After receiving the measured bandwidth sent by the base station, the terminal finds that the 5 M measured bandwidth falls within the range of 11 to 26 by searching the correspondence table preset locally, to determine that the size of the corresponding measured sub-band is 2 RBs and that the quantity of the measured sub-band sets is 2. Table 1 is only an example. The specific values are not limited in this embodiment.

TABLE 1

| Measured Bandwidth (RB) | Measured Sub-band Size (RB) | Measured Sub-band Set |
| --- | --- | --- |
| ≤10 | 1 | 1 |
| 11-26 | 2 | 2 |
| 27-63 | 3 | 3 |
| 64-110 | 4 | 4 |

When the size of the measured sub-band is determined by using this method, the size of the measured sub-band determined according to the measured bandwidth is generally smaller than the size of a system sub-band that is determined according to the system bandwidth because the measured bandwidth is generally smaller than the system bandwidth. Therefore, the granularity of sub-band measurement is reduced and the precision of sub-band measurement is improved.

(3) If the size of the measured sub-band is preset to be the same as the size of a RBG (Resource Block group, resource block group) in resource scheduling, the terminal obtains the RBG and uses the size of the obtained RBG as the size of the measured sub-band.

The method for obtaining the RBG by the terminal includes: storing a correspondence table between the system bandwidth and the RBG by each of the base station and the terminal, and determining, by the terminal, a current RBG from the correspondence table according to the system bandwidth. This embodiment does not exclude other methods for obtaining the RBG.

As compared with the prior art where scheduling granularity is smaller than feedback granularity, using this method to determine the size of the measured sub-band may solve the problem that feedback granularity does not match scheduling granularity, so as to ensure the frequency selection scheduling gain in small scheduling granularity.

307. The terminal performs measurement according to the obtained information and returns the measurement results.

Specifically, the terminal measures the measured bandwidth of the corresponding location and size according to the size of the measured bandwidth and the location of the measured bandwidth in the system bandwidth; or measures the measured sub-band of a corresponding size at the measured bandwidth of the corresponding location and size according to the size of the measured bandwidth and the location of the measured bandwidth in the system bandwidth, and the size of the measured sub-band; or measures measured sub-bands of the corresponding size in the measured sub-band sets of the corresponding quantity/size at the measured bandwidth of the corresponding location and size according to the size of the measured bandwidth and the location of the measured bandwidth in the system bandwidth, and the size of the measured sub-band and the quantity/sizes of measured sub-band sets.

In addition, when the terminal also receives the reference signals that are transmitted by the base station within the range of the measured bandwidth, the terminal measures the measured bandwidth of the corresponding location and size according to the reference signals and obtains the measurement results; or the terminal measures the measured sub-band of the corresponding size at the measured bandwidth of the corresponding location and size according to the reference signals and obtains the measurement results; or the terminal measures measured sub-bands of the corresponding size in the measured sub-band sets of the corresponding quantity/size at the measured bandwidth of the corresponding location and size according to the reference signals and obtains the measurement results.

In addition, channel measurement may be performed by the terminal in the following channel measurement modes: bandwidth measurement mode and sub-band measurement mode. Each mode includes periodic feedback and non-periodic feedback. Taking the measurement indexes CQI and PMI as examples, the following describes how to implement measurement in different modes by combining the present technical solution with an LTE Rel-8 feedback mode.

(1) Periodic Feedback

Broadband CQI and PMI: The average CQI and PMI at the measured bandwidth are used as the measurement results and fed back to the base station.

Sub-band CQI: The measured bandwidth is divided into several measured sub-band sets. Each measured sub-band set is formed by several measured sub-bands. At each feedback time, the terminal measures the CQI at one optimal measured sub-band in one measured sub-band set, feeds back the CQI and the location of the CQI in the measured sub-band set to the base station, and feeds back the CQI on one optimal measured sub-band in each measured sub-band set in the entire measured bandwidth in time-sharing cyclic mode.

(2) Non-Periodic Feedback

Broadband CQI and PMI: The definitions are the same as those of the broadband CQI and PMI in periodic feedback.

Sub-Band CQI:

UE-Selected mode: The terminal divides the measured bandwidth into several measured sub-bands according to the obtained size of the measured sub-band, selects M optimal measured sub-bands in the measured bandwidth, measures the average CQI of the M measured sub-bands, and feeds back the average CQI to the base station.

High Layer-Configured mode: The terminal divides the measured bandwidth into several measured sub-bands according to the obtained size of the measured sub-band, measures the CQI on each measured sub-band, and feeds back the measured CQI on each measured sub-band to the base station.

Sub-Band PMI:

UE-Selected mode: The terminal divides the measured bandwidth into several measured sub-bands according to the obtained size of the measured sub-band, selects M optimal measured sub-bands in the measured bandwidth, measures the average PMI of the M measured sub-bands, and feeds back the average PMI to the base station.

Multi-PMI mode: The terminal divides the measured bandwidth into several measured sub-bands according to the obtained size of the measured sub-band, measures the PMI on each measured sub-band, and feeds back the measured PMI on each measured sub-band to the base station.

308. The base station receives measurement results returned by the terminal.

According to the method provided in this embodiment, the base station determines the size of the measured bandwidth of the terminal and the location of the measured bandwidth in the system bandwidth, and the size of the measured sub-band and/or the quantity/sizes of measured sub-band sets, and notifies the information to the terminal. According to the information, the terminal performs measurement, thereby preventing invalid feedback and improving effectiveness and accuracy of channel measurement and feedback. Meanwhile, measurement precision is high, uplink signaling resources are saved, the frequency selection scheduling gain in small scheduling granularity is ensured, and the energy is saved.

Embodiment 4

Figure 4:
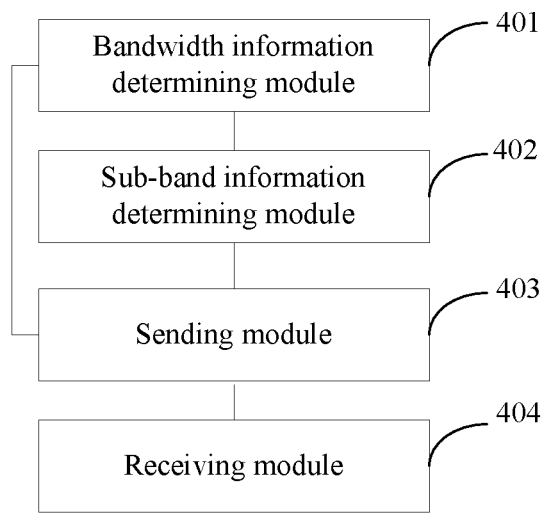
FIG. 4 is a schematic diagram of an apparatus for channel measurement according to a third embodiment of the present invention.

Referring to FIG. 4, this embodiment provides an apparatus for channel measurement, including:

a bandwidth information determining module 401, configured to determine the size of measured bandwidth of a terminal and the location of the measured bandwidth in system bandwidth;

a sub-band information determining module 402, configured to determine the size of a measured sub-band and/or the quantity/sizes of measured sub-band sets according to the measured bandwidth determined by the bandwidth information determining module 401;

a sending module 403, configured to send the size of the measured bandwidth and the location of the measured bandwidth in the system bandwidth that are determined by the bandwidth information determining module 401, and the size of the measured sub-band and/or the quantity/sizes of measured sub-band sets that are determined by the sub-band information determining module 402 to the terminal; and a receiving module 404, configured to receive measurement results returned by the terminal, where the measurement results are obtained after the terminal measures the measured bandwidth of the corresponding location and size, or obtained after the terminal measures the measured sub-band of the corresponding size at the measured bandwidth of the corresponding location and size, or obtained after the terminal measures measured sub-bands of the corresponding size in the measured sub-band sets of the corresponding quantity/size at the measured bandwidth of the corresponding location and size.

Figure 5:
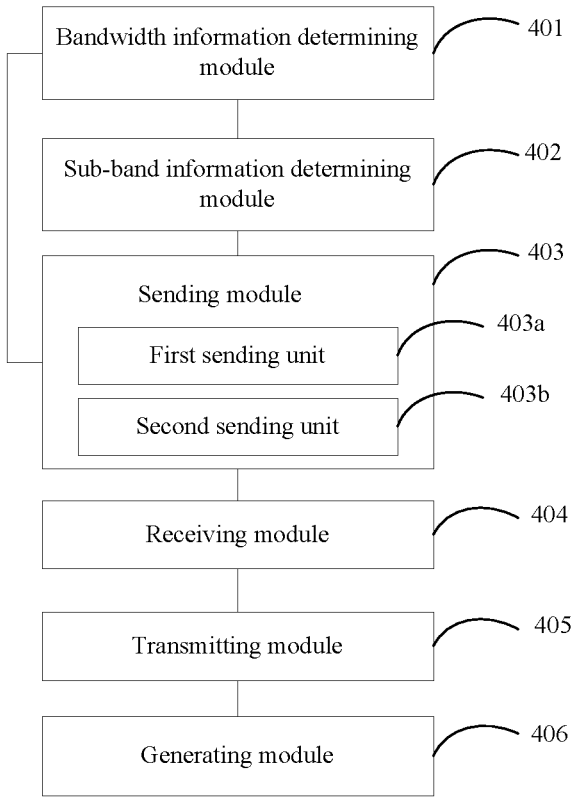
FIG. 5 is another schematic diagram of an apparatus for channel measurement according to the third embodiment of the present invention.

Referring to FIG. 5, as compared with the apparatus for channel measurement in the embodiment illustrated in FIG. 4, an apparatus for channel measurement provided in another embodiment further includes:

a transmitting module 405, configured to transmit reference signals within the range of the measured bandwidth; and a receiving module 404, configured to receive measurement results returned by the terminal, where the measurement results are obtained after the terminal measures the measured bandwidth of the corresponding location and size according to the reference signals, or obtained after the terminal measures the measured sub-band of the corresponding size at the measured bandwidth of the corresponding location and size according to the reference signals, or obtained after the terminal measures measured sub-bands of the corresponding size in the measured sub-band sets of the corresponding quantity or size at the measured bandwidth of the corresponding location and size according to the reference signals.

As compared with the apparatus for channel measurement in the embodiment illustrated in FIG. 5, another embodiment provides an apparatus for channel measurement further includes:

a generating module 406, configured to generate the reference signals according to the measured bandwidth before the reference signals are transmitted within the range of the measured bandwidth.

The sending module 403 includes a first sending unit 403a and a second sending unit 403b.

The first sending unit 403a is configured to send location information of the system sub-band set occupied by a terminal to the terminal if the system bandwidth is divided into at least one system sub-band set.

The second sending unit 403b is configured to send the start position and length of the measured bandwidth to the terminal.

The apparatus provided in this embodiment and the base station provided in the method embodiments are based on the same concept, so for the detailed implementation, reference can be made to the method embodiments, and details are not repeated herein.

According to the apparatus provided in this embodiment, the size of the measured bandwidth of the terminal and the location of the measured bandwidth in the system bandwidth, and the size of the measured sub-band and/or the quantity/sizes of measured sub-band sets are determined, and notified to the terminal. According to the above information, the terminal performs measurement, thereby preventing invalid feedback and improving effectiveness and accuracy of channel measurement and feedback. Meanwhile, the measurement precision is high, uplink signaling resources are saved, the frequency selection scheduling gain in small scheduling granularity is ensured, and the energy is saved.

Embodiment 5

Figure 6:
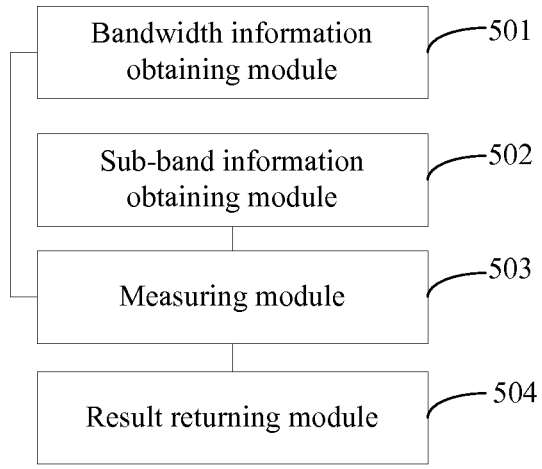
FIG. 6 is a schematic diagram of an apparatus for channel measurement according to a fourth embodiment of the present invention.

Referring to FIG. 6, this embodiment provides an apparatus for channel measurement, including:

a bandwidth information obtaining module 501, configured to obtain the size of measured bandwidth and the location of the measured bandwidth in system bandwidth, where the size and the location are sent by a base station;

a sub-band information obtaining module 502, configured to obtain the size of a measured sub-band and/or the quantity/sizes of measured sub-band sets; and a measuring module 503, configured to measure the measured bandwidth of the corresponding location and size according to the size of the measured bandwidth and the location of the measured bandwidth in the system bandwidth that are obtained by the bandwidth information obtaining module 501; or measure the measured sub-band of the corresponding size at the measured bandwidth of the corresponding location and size according to the size of the measured bandwidth and the location of the measured bandwidth in the system bandwidth that are obtained by the bandwidth information obtaining module 501, and the size of the measured sub-band obtained by the sub-band information obtaining module 502; or measure measured sub-bands of the corresponding size in the measured sub-band sets of the corresponding quantity/size at the measured bandwidth of the corresponding location and size according to the size of the measured bandwidth and the location of the measured bandwidth in the system bandwidth that are obtained by the bandwidth information obtaining module 501, and the size of the measured sub-band and the quantity/size of the measured sub-band sets that are obtained by the sub-band information obtaining module 502.

Figure 7:
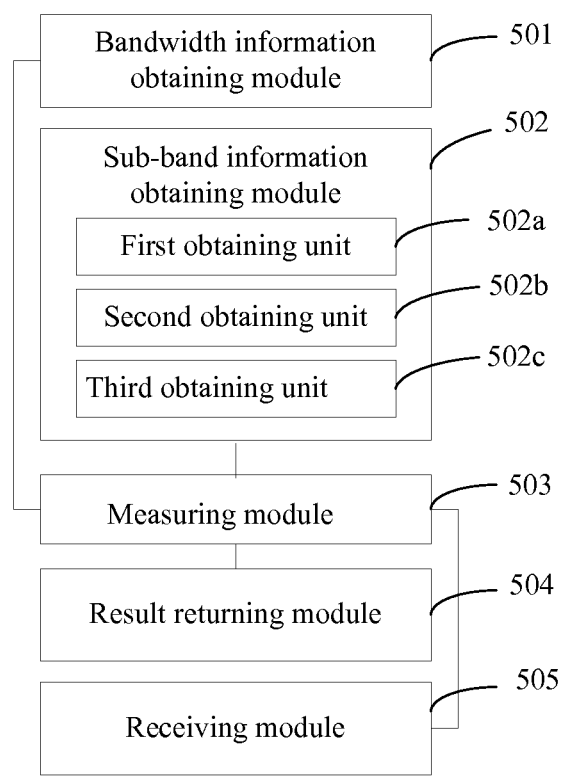
FIG. 7 is another schematic diagram of an apparatus for channel measurement according to the fourth embodiment of the present invention.

Referring to FIG. 7, as compared with the apparatus for channel measurement in the embodiment illustrated in FIG. 6, the sub-band information obtaining module 502 in an apparatus for channel measurement in another embodiment further includes: a first obtaining unit 502a, a second obtaining unit 502b, or a third obtaining unit 502c.

The first obtaining unit 502a is configured to receive the size of a measured sub-band and/or the quantity/sizes of measured sub-band sets, where the size of the measured sub-band and/or the quantity/size of the measured sub-band sets are corresponding to the measured bandwidth and are sent by the base station.

The second obtaining unit 502b is configured to determine the size of the measured sub-band and/or the quantity/size of the measured sub-band sets corresponding to the measured bandwidth according to the obtained size of the measured bandwidth and a preset correspondence between the size of the measured sub-band and/or the quantity/size of the measured sub-band sets and the measured bandwidth.

The third obtaining unit 502c is configured to obtain a resource block group RBG in resource scheduling and use the size of the obtained RBG as the size of the measured sub-band, if the size of the measured sub-band is preset to be the same as the size of the RBG.

The apparatus further includes:

a receiving module 505, configured to receive reference signals that are transmitted by the base station within the range of the measured bandwidth. Correspondingly, the measuring module 503 is further configured to measure the measured bandwidth of the corresponding location and size according to the reference signals; or measure the measured sub-band of the corresponding size at the measured bandwidth of the corresponding location and size according to the reference signals; or measure measured sub-bands of the corresponding size in the measured sub-band sets of the corresponding quantity/size at the measured bandwidth of the corresponding location and size according to the reference signals.

The apparatus provided in this embodiment and the terminal provided in the method embodiments are based on the same concept, so for the detailed implementation, reference can be made to the method embodiments, and details are not repeated herein.

According to the apparatus provided in this embodiment, the size of the measured bandwidth and the location of the measured bandwidth in the system bandwidth, and the size of the measured sub-band and/or the quantity/sizes of measured sub-band sets that are sent by the base station are obtained. According to the above information, measurement is performed, thereby preventing invalid feedback and improving effectiveness and accuracy of channel measurement and feedback. Meanwhile, the measurement precision is high, uplink signaling resources are saved, the frequency selection scheduling gain in small scheduling granularity is ensured, and the energy is saved.

All or a part of the contents in the technical solutions according to the embodiments can be implemented by software programming. The software programs may be stored in a readable storage medium, such as a hard disk, a CD-ROM, or a magnetic disk in the computer.

In conclusion, the above are merely exemplary embodiments of the present invention, and the present invention is not limited thereto. Variations, replacements, or improvements made without departing from the idea and principle of the present invention shall fall within the protection scope of the present invention.

What is claimed is:

1. A method for channel measurement, comprising:
   determining a size of measured bandwidth of a terminal and a location of the measured bandwidth in system bandwidth;
   determining at least one of
   a size of a measured sub-band, and
   a quantity or sizes of measured sub-band sets according to the measured bandwidth; sending, to the terminal, at least one of
   the determined size and location of the measured bandwidth in the system bandwidth,
   the determined size of the measured sub-band and
   the determined quantity or sizes of the measured sub-band sets;
   transmitting, to the terminal, reference signals within a range of the measured bandwidth, the reference signals being Channel State Information Reference Signals (CSI-RS); and
   receiving measurement results returned by the terminal, wherein the measurement results are obtained
   after the terminal measures the measured bandwidth of the determined size and location in the system bandwidth according to the reference signals transmitted to the terminal,
   after the terminal measures the measured sub-band of the determined size at the measured bandwidth of the determined size and location in the system bandwidth according to the reference signals transmitted to the terminal, or
   after the terminal measures measured sub-bands of a corresponding size in the measured sub-band sets of the determined quantity or sizes at the measured bandwidth of the determined size and location in the system bandwidth according to the reference signals transmitted to the terminal.

2. The method according to claim 1, wherein before the transmitting reference signals within the range of the measured bandwidth, the method further comprises:
   generating the reference signals according to the measured bandwidth.

3. The method according to claim 1, wherein the sending comprises:
   sending location information of a system sub-band set occupied by the terminal to the terminal if the system bandwidth is divided into at least one system sub-band set; or,
   sending a start position and length of the measured bandwidth to the terminal.

4. The method according to claim 1, wherein the sending sends in a broadcast manner or a dedicated signaling manner.

5. A method for channel measurement, comprising:
   obtaining a size of measured bandwidth and a location of the measured bandwidth in system bandwidth, wherein the size and the location are sent by a base station;
   obtaining at least one of
   a size of a measured sub-band, and
   a quantity or sizes of measured sub-band sets;
   receiving reference signals transmitted by the base station within a range of the measured bandwidth, the reference signals being Channel State Information Reference Signals (CSI-RS);
   measuring at least one of:
   the measured bandwidth of the obtained size and location according to the obtained size and location of the measured bandwidth in the system bandwidth according to the received reference signals,
   the measured sub-band of the obtained size at the measured bandwidth of the obtained size and location according to the obtained size and location of the measured bandwidth in the system bandwidth, and the obtained size of the measured sub-band, according to the received reference signals; and
   measured sub-bands of a corresponding size in the measured sub-band sets of the obtained quantity or sizes at the measured bandwidth of the obtained size and location according to the obtained size and location of the measured bandwidth in the system bandwidth, and the obtained size of the measured sub-band and the obtained quantity or sizes of the measured sub-band sets, according to the received reference signals; and
   returning measurement results to the base station.

6. The method according to claim 5, wherein the obtaining at least one of the size of the measured sub-band, and the quantity or sizes of the measured sub-band sets comprises:
   receiving the size of the measured sub-band and/or the quantity or sizes of the measured sub-band sets, wherein the size of the measured sub-band and/or the quantity or sizes of the measured sub-band sets are corresponding to the measured bandwidth and are sent by the base station;
   determining the size of the measured sub-band and/or the quantity or sizes of the measured sub-band sets corresponding to the measured bandwidth according to the obtained size of the measured bandwidth and a preset correspondence between the size of the measured sub-band and/or the quantity or sizes of the measured sub-band sets and the measured bandwidth; or
   if presetting the size of the measured sub-band to be the same as a size of a resource block group (RBG) in resource scheduling, obtaining the RBG and using the size of the obtained RBG as the size of the measured sub-band.

7. An apparatus for channel measurement, comprising:
   a bandwidth information determining module, configured to determine a size of measured bandwidth of a terminal and a location of the measured bandwidth in system bandwidth;
   a sub-band information determining module, configured to determine at least one of
   a size of a measured sub-band, and
   a quantity or sizes of measured sub-band sets according to the measured bandwidth;
   a sending module, configured to send, to the terminal, at least one of
   the determined size and location of the measured bandwidth in the system bandwidth that are determined by the bandwidth information determining module,
   the determined size of the measured sub-band that is determined by the sub-band information determining module, and
   the determined quantity or sizes of the measured sub-band sets that are determined by the sub-band information determining module; and
   a transmitting module, configured to transmit, to the terminal, reference signals within a range of the measured bandwidth, the reference signals being Channel State Information Reference Signals (CSI-RS);

a receiving module, configured to receive measurement results returned by the terminal, wherein the measurement results are obtained
- after the terminal measures the measured bandwidth of the determined size and location in the system bandwidth, according to the reference signals transmitted to the terminal,
- after the terminal measures the measured sub-band of the determined size at the measured bandwidth of the determined size and location in the system bandwidth, according to the reference signals transmitted to the terminal, or
- after the terminal measures measured sub-bands of a corresponding size in the measured sub-band sets of the determined quantity or sizes at the measured bandwidth of the determined size and location in the system bandwidth, according to the reference signals transmitted to the terminal.

8. The apparatus according to claim 7, further comprising:
a generating module, configured to, before the reference signals are transmitted within the range of the measured bandwidth, generate the reference signals according to the measured bandwidth;
wherein the transmitting module is configured to transmit the reference signals generated by the generating module.

9. The apparatus according to claim 7, wherein the sending module comprises: a first sending unit or a second sending unit; wherein:
the first sending unit is configured to send location information of a system sub-band set occupied by the terminal to the terminal if the system bandwidth is divided into at least one system sub-band set; and
the second sending unit is configured to send a start position and length of the measured bandwidth to the terminal.

* * * * *